United States Patent [19]

Sato

[11] Patent Number: 5,333,351
[45] Date of Patent: Aug. 2, 1994

[54] WIPER SYSTEM
[75] Inventor: Katsutoshi Sato, Takasaki, Japan
[73] Assignee: Mitsuba Electric Mfg. Co., Ltd., Gumma, Japan
[21] Appl. No.: 103,486
[22] Filed: Aug. 6, 1993
[30] Foreign Application Priority Data Aug. 27, 1992 [JP] Japan .............................. 4-066272[U]

[51] Int. Cl.$^5$ .............................. B60S 1/06; B60S 1/18
[52] U.S. Cl. .............................. 15/250.13; 15/250.16; 74/42; 74/43; 74/836; 74/600; 74/522; 318/DIG. 2
[58] Field of Search ........... 15/250.13, 250.12, 250.16, 15/250.17, 250.19; 74/42, 43, 600, 602, 828, 522, 571 M, 836, 70, 75, 601, 834; 318/DIG. 2

[56] References Cited

U.S. PATENT DOCUMENTS

| 2,173,447 | 9/1939 | Horton | 15/250.13 |
| 2,298,197 | 10/1942 | Coffey | 15/250.13 |
| 4,494,421 | 1/1985 | Matuoka | 15/250.17 |
| 4,934,014 | 6/1990 | Yamamoto | 15/250.13 |
| 5,142,729 | 9/1992 | Imamura | 15/250.13 |
| 5,201,094 | 4/1993 | Yamamoto et al. | 15/250.13 |
| 5,287,585 | 2/1994 | Yamamoto et al. | 15/250.13 |

FOREIGN PATENT DOCUMENTS 2-136357  5/1990  Japan .

Primary Examiner—Timothy F. Simone
Assistant Examiner—Gary K. Graham
Attorney, Agent, or Firm—Skjerven, Morrill, MacPherson, Franklin & Friel

[57] ABSTRACT

To allow compact design of a wiper system equipped with a wiping angle varying assembly which comprises an actuating motor, an eccentric cam member provided in a path of transmitting the movement of the output end of a wiper motor to a wiper arm, and a control unit for activating the actuating motor so as to move the eccentric cam member and thereby change the range of angle of the wiping movement by altering a configuration of a linkage structure provided between the wiper motor and the wiper arm, the control unit is adapted to activate the eccentric cam member with such a timing that the force transmitted through the linkage structure from the wiper motor to the wiper arm tends to assist the force produced by the actuating motor to move the eccentric cam member in the required direction. Thus, the requirement of the power output of the actuating motor can be reduced, and the actuating motor can be substantially reduced in size. As a result, the design of the wiping angle varying assembly is simplified, and the assembly may be conveniently incorporated in a linkage structure similar in structure to the conventional linkage structure for wiper systems not equipped with any wiping angle varying assembly.

8 Claims, 8 Drawing Sheets

WIPER SYSTEM

TECHNICAL FIELD

The present invention relates to a wiper system, and in particular to a wiper system which can variably control its wiping angle.

BACKGROUND OF THE INVENTION

Some of the conventional wiper systems for vehicles such as automobiles can change the speed of the movement of the wiper depending on the intensity of rain fall. If the rain fall is substantial, the wiping speed is increased, and vice versa. Some wiper systems are provided with the intermittent operation mode in which the wiper system is activated in an intermittent manner. This mode is useful when there is minimal rain fall.

In an automobile equipped with such a wiper system, the speed of the wiper movement can be reduced in low speed range and increased in high speed range so that the optimum control of the wiper can be achieved in accordance with the vehicle speed.

When the vehicle is travelling at a high speed, the wind blows against the windshield at a high speed, and it is thus conceivable to reduce the wiping angle so that the force required for the movement of the wiper may be reduced, and, for instance, Japanese patent laid open publication (kokai) No. 02-136357 discloses such a wiping angle varying device. By thus allowing the wiping angle to be varied, it is possible to achieve an optimum wiping result at each vehicle speed.

However, according to such a conventional wiping angle varying device, the varying of the wiping angle may be required to take place during the wiping movement. Therefore, the motor which, for instance, consists of an electric motor is required to be powerful enough to change the wiping angle without being hindered by the force acting upon the wiper arm for the purpose of driving the wiper arm into the wiping movement by overcoming the frictional force which the wiper arm experiences. As a result, the wiper system tends to be bulky, and create problems in designing its mounting arrangement.

BRIEF SUMMARY OF THE INVENTION

In view of such problems of the prior art, a primary object of the present invention is to provide a wiper system equipped with means for changing the wiping angle which is compact in size.

A second object of the present invention is to provide a wiper system equipped with means for completing the process of changing the wiping angle without requiring an excessively bulky drive structure.

According to the present invention, such an object can be accomplished by providing a wiper system, comprising: wiper motor means; a wiper arm having a base end pivotally supported by a vehicle body and a free end carrying a wiper blade; linkage means for transmitting movement of an output end of the wiper motor means to the wiper arm so as to achieve a desired wiping movement of the wiper blade; and a wiping angle varying assembly included within the linkage means for varying the range of angle of the wiping movement of the wiper blade; the wiping angle varying assembly comprising actuator means, eccentric cam means provided in a path of transmitting the movement of the output end of the motor to the wiper arm, and control means for activating the actuator means so as to move the eccentric cam means and thereby change the range of angle of the wiping movement by altering a configuration of the linkage means; the control means activating the actuator means only when a first force transmitted through the linkage means from the wiper motor means to the wiper arm does not substantially oppose a second force produced by the actuator means to move the eccentric cam means.

Preferably, the control means activates the actuator means with such a timing that the first force transmitted through the linkage means from the wiper motor means to the wiper arm tends to assist the second force produced by the actuator means to move the eccentric cam means.

Thus, the actuator means is not required to overcome the first force produced by the wiper motor means to achieve a desired change in the configuration of the linkage means. As a result, the actuator means may consist of a relatively small motor, and can quickly achieve the desired change in the configuration of the linkage means.

According to a preferred embodiment of the present invention, there are a pair of wiper arms each pivotally supported by the vehicle body at a base end thereof and carrying a wiper blade at a free end thereof; and the linkage means comprises; a first pivot lever pivotally supported by the vehicle body, the base end of a first one of the wiper arms being integrally connected to the first pivot lever; a second pivot lever pivotally supported by the vehicle body, the base end of a second one of the wiper arms being integrally connected to the second pivot lever; a first connecting rod having a first end connected to an output end of the wiper motor means and a second end pivotally connected to a free end of the first pivot lever via joint means; and a second connecting rod having a first end connected to a free end of the first pivot lever and a second end pivotally connected to a free end of the second pivot lever; the joint means being adapted to be moved toward and away from a center of rotation of the first pivot lever by the actuator means and the eccentric cam means.

The term "eccentric cam means" used herein should be understood in its broadest meaning, and includes not only eccentric cams but also all other mechanical or other means which act between two members of the linkage means and are subjected to the force transmitted from the wiper motor means to the wiper arms when achieving the required change in the linkage means.

According to a particularly preferred embodiment of the present invention, the eccentric cam means and the joint means comprise a lever arm member pivotally secured to the first pivot lever, and a ball joint member secured to the lever arm member offset from a center of rotation of the lever arm member relative to the first pivot lever, the second end of the first connecting rod being coupled to the ball joint member. Furthermore, the first pivot lever is pivotally supported by the vehicle body via a hollow pivot shaft integrally attached to the first pivot lever, and the actuator means comprises an electric actuator motor coaxially received in the pivot shaft, an actuator arm member integrally secured to an output shaft of the actuator motor, and a link member having a first end pivotally connected to the actuator arm member and a second end pivotally connected to a part of the lever arm member spaced from a center of rotation of the lever arm member relative to the first pivot lever.

Thus, the actuator means can be conveniently incorporated in linkage means which is very similar to the conventional linkage for normal wiper systems.

Normally, the control means comprises a position sensor for detecting positions of the first pivot lever immediately before and after a reversal point at which the first pivot lever changes its direction of movement, and selectively activates the actuator means when the first pivot lever is immediately before or after the reversal point depending on a relationship between directions of the first and second forces.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
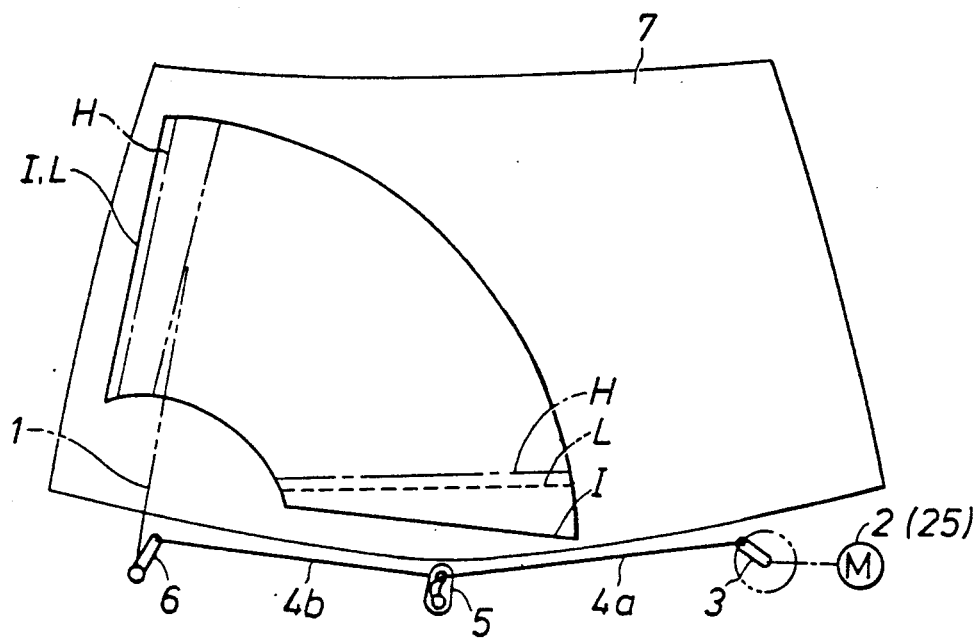
FIG. 1 is a diagram showing the variable range of the wiping angle of a wiper system to which the present invention is applied.

FIG. 1 is a schematic view showing the variable range of the sweeping angle of the wiper system according to the present invention. FIG. 1 only shows the range of the sweeping angle for the driver's side, but the same thing applies to the passenger's side. The wiper arm 1 for the driver's side is actuated by a wiper motor 2 via a linkage mechanism so as to synchronize with the wiper arm for the passenger's side which is not shown in the drawing. When a crank arm 3 is rotatively driven by the wiper motor 3, a first pivot lever 5 is made to undergo an angular movement via a first connecting rod 4a, and a second pivot lever 6 is likewise made to undergo a similar angular movement via a second connecting rod 4b which is connected between the first pivot lever 5 and the second pivot lever 6. The wiper arms for the driver's side and the passenger's side integrally connected to the corresponding pivot levers 5 and 6 are thereby made to undergo the desired sweeping movement relative to a front windshield 7.

In this wiper system, it is possible to select three modes of operation, intermittent, low speed and high speed, and the sweeping angle for each of the operating modes is determined so that a desired sweeping range may be obtained in each of the operating modes. For instance, the sweeping range for the intermittent mode is the sector area I—I indicated by the solid lines, the sweeping range for the low speed mode is the sector area L—L indicated by the broken lines, and the sweeping range for the high speed mode is the sector area H—H indicated by the one-dot chain lines, the sweeping range thus being progressively narrowed as the operating speed is increased.

Figure 2:
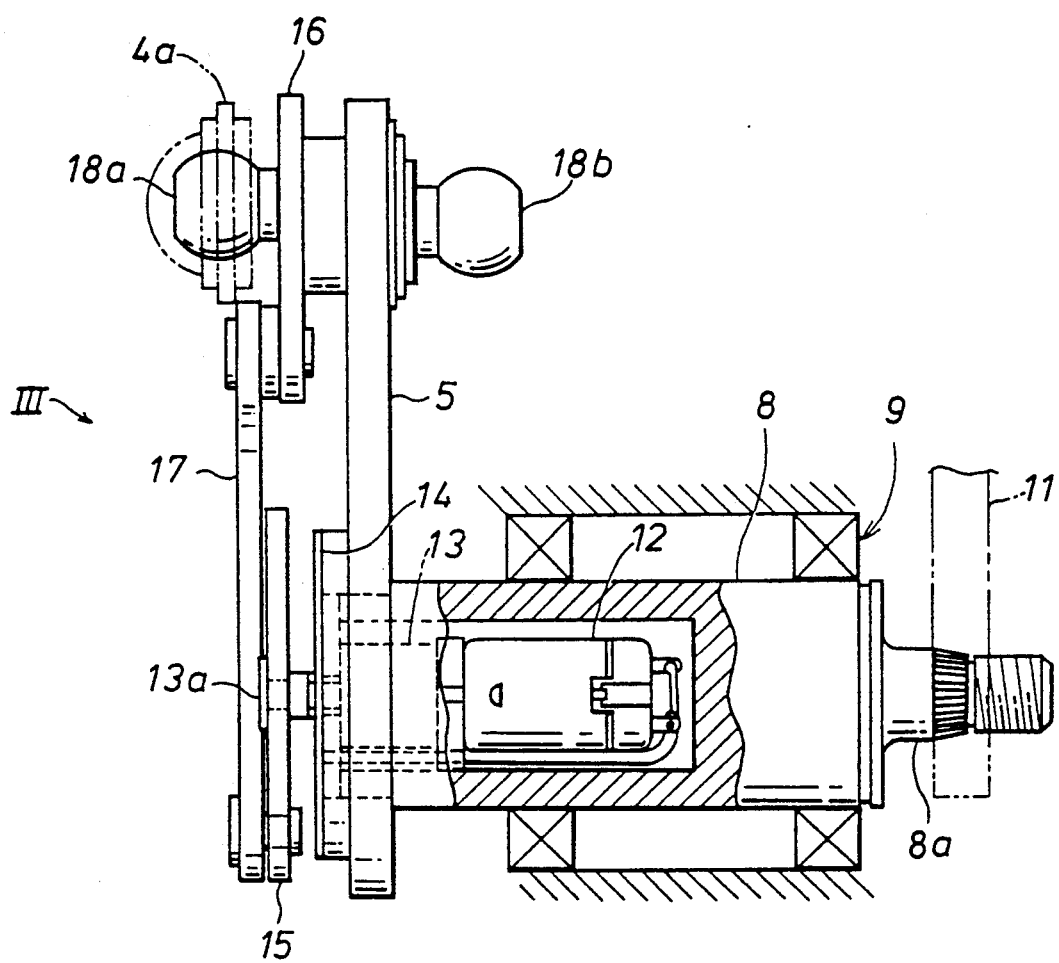
FIG. 2 is a partly broken away side view of a wiping angle varying assembly which is conveniently incorporated in the pivot lever according to the present invention.

The mechanism for achieving such variable sweeping ranges is incorporated in the first pivot lever 5 provided in an intermediate part of the wiper system, and its structure is now described in the following with reference to FIGS. 2 and 3. The pivot lever 5 is rotatably supported by the vehicle body by way of a tubular pivot shaft 8 laterally and integrally extending from a base end of the pivot lever 5 and supported by the vehicle body via bearings 9. The pivot shaft 8 is coaxially provided with a wiper mounting shaft 8a on which an arm head of the wiper arm 11 for the passenger's side is mounted via a tapered serration coupling.

The pivot shaft 8 accommodates therein a wiping angle varying motor 12. The output torque of the wiping angle varying motor 12 is taken out via a speed reduction unit 13, and the pivot lever 5 is provided with a sector-shaped relay plate 14 which surrounds an intermediate part of an output shaft 13a of the speed reduction unit 13. Further, a disk-shaped crank member 15 is fixedly secured to a free end of the output shaft 13a of the speed reduction unit 13. A lever arm member 16 serving as an eccentric cam is pivotally attached to a free end of the pivot lever 5, and this lever arm member 16 is linked with the crank member 15 via a substantially L-shaped link rod 17.

A joint ball 18a for the first connecting rod 4a connected to the output end of the wiper motor 2 is provided in a part of the lever arm member 16 which is offset by a prescribed amount (indicated by r in the drawing) from the center of rotation of the lever arm member 16. As the wiping angle varying motor 12 rotates, the output shaft 13a of the reduction unit 13 rotates over a prescribed angle in either direction, and the resulting angular movement of the lever arm member 16 causes the joint ball 18a to move along a circular path of a radius R centered around the center of rotation of the lever arm member 16. FIGS. 2 and 3 show the case in which the wiper system is operating in the high speed mode, and the effective radius of rotation of the pivot lever 5 in this case is Rh as shown in FIG. 3. The link rod 17 and the lever arm member 16 are made to rotate in such a manner that the terminal point of the movement of the connecting point between the crank member 15 and the link rod 17 and that of the connecting point between the lever arm member 16 and the link rod 17 are indicated by H in the drawing in the case of the high speed mode, by L in the case of the low speed mode, and by I in the case of the OFF position and the intermittent mode. The side of the pivot lever 5, opposite to the side to which the joint ball 18a is connected, has a joint ball 18b of the second connecting rod 4b connected thereto.

Figure 4:
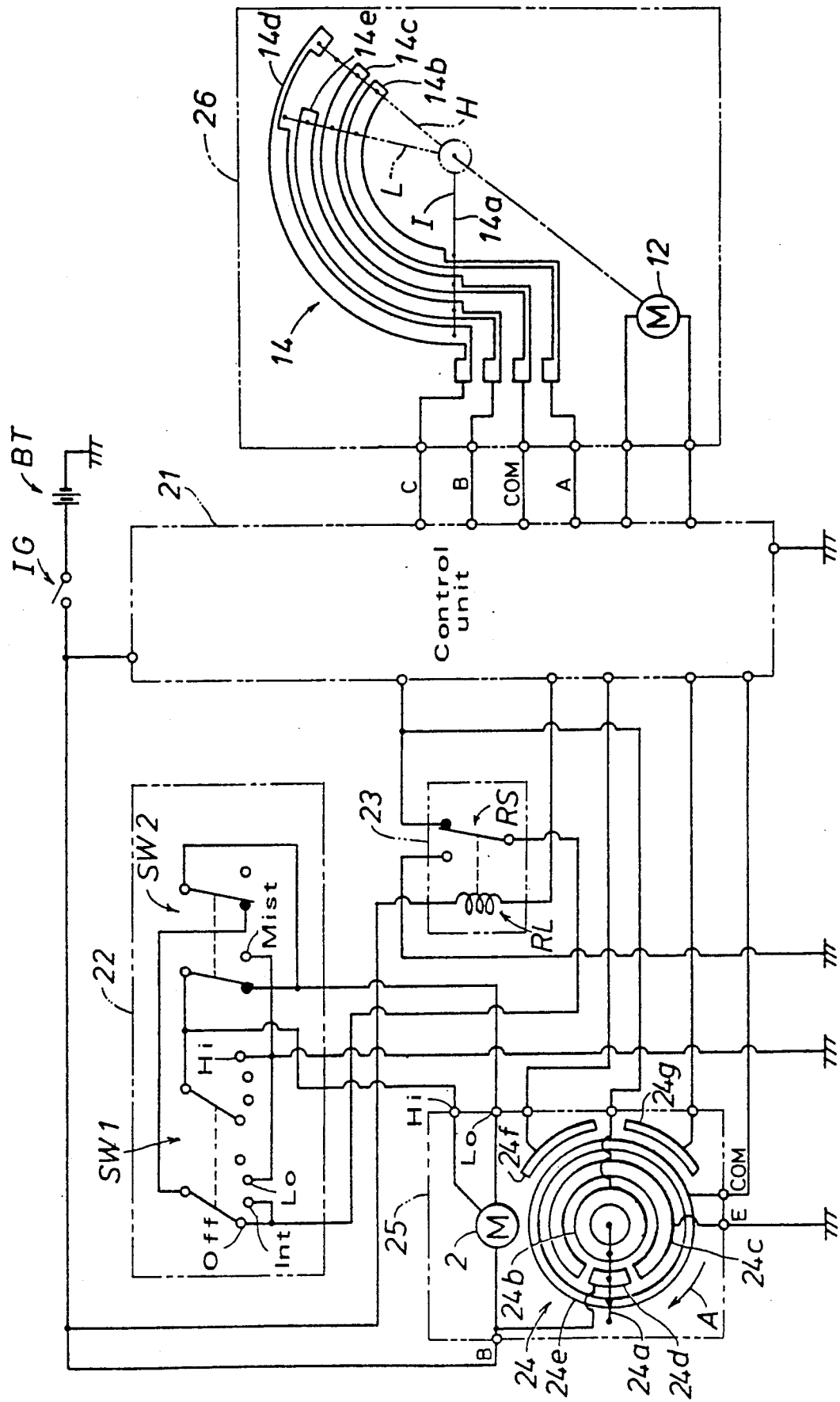
FIG. 4 is a circuit diagram of the control unit for the present invention.

FIG. 4 shows a circuit diagram of the control circuitry of the wiper system of the present invention, and its details are described in the following. A control unit 21 including a CPU and power transistors for effecting the control of the wiper system obtains its electric power from a battery BT via an ignition switch IG. The control circuit of the wiper system comprises, in addition to the control unit 21, a wiper switch 22 for selecting the operating mode of the wiper system, an intermittent relay 23 for achieving an intermittent operation, a wiper motor unit 25 consisting of the aforementioned wiper motor 2 and a position sensor 24 operating in association with the movement of the wiper motor 2, and a wiping angle varying unit 26 consisting of the aforementioned wiping angle varying motor 12 and the relay plate 14.

The wiper switch 22 comprises a switch unit SW1 having a pair of four-position selection contacts for selecting the OFF, intermittent, low speed and high speed operation modes, and a switch unit SW2 having a pair of two-position selection contacts for selecting the mist operation mode in which washer fluid is sprayed onto the windshield. The common terminal of one of the selection switches of the switch unit SW1 is connected to the normally closed terminal of one of the selection switches of the switch unit SW2, and the common terminal of the last mentioned selection switch and the normally closed terminal of the other selection switch of the switch unit SW2 are connected to the low speed drive terminal LO of the wiper motor 2. The B terminal or the power terminal of the wiper motor 2 is connected to the secondary end of the ignition switch IG.

The common terminal of the other switch of the switch unit SW1 is connected to the common terminal of the other selection switch of the switch unit SW2, and the node between them is connected to the high speed drive terminal Hi of the wiper motor 2. The selection contacts for the OFF and intermittent operation modes of the said one of the selection switch of the switch unit SW1 are connected to the common terminal of the switch RS of the intermittent relay 23. The normally open contact of the switch RS is grounded while the normally closed contact of the switch RS is connected to the corresponding terminal of the control unit 21. The low speed selection contact of the said one of the selection switches of the switch unit SW1, the high speed selection contact of the other selection switch of the switch unit SW1, and the mist selection contact of one of the selection switch of the switch unit SW2 are grounded.

The open terminals of the switch unit SW1 and SW2 shown in FIG. 4 are connected to the control unit 21 so that the control unit 21 may detect when any one of these contacts is selected although it is not shown in the drawing to avoid crowding the drawing. One end of the coil RL of the intermittent relay 23 is connected to the secondary end of the ignition switch IG, and the other end of the coil RL is connected to the corresponding terminal of the control unit 21.

The position sensor 24 of the wiper motor unit 25 comprises a rotary slider assembly 24a which integrally rotates with the motor shaft of the wiper motor 2, and fixed contacts 24b through 24g coaxially arranged along four concentric circles either in annular or arcuate configuration for detecting the prescribed positions of the wiper arm. The rotary slider assembly 24a is provided with four sliders which slide over the innermost annular fixed contact 24b, the large and small arcuate fixed contacts 24c and 24d surrounding the annular contact 24b, the outer annular fixed contact 24e surrounding the arcuate contacts 24c and 24d, and a pair of outermost arcuate fixed contacts 24f and 24g so that a desired state of conduction can be achieved between the fixed contacts 24b through 24g according to the way they are arranged.

The innermost contact 24b is connected to the node between the normally closed contact of the switch RS of the intermittent relay 23 and the connecting terminal of the control unit 21 corresponding thereto. The larger arcuate contact 24c immediately outside this contact is grounded while the smaller arcuate contact 24d corresponds to the point of reversal from the normal direction or positions for retracting the wiper arm and effecting the autostop, and is connected to the terminal B for power supply to the wiper motor 2. The contact 24e surrounding them is used as a common terminal, and is connected to a corresponding terminal of the control unit 21. The outermost contacts 24f and 24g extend on either side of a point of reversal from the reverse direction each over a certain range, and are connected to respective terminals of the control unit 21.

The two terminals of the wiping angle varying motor 12 are connected to a corresponding pair of drive output terminals of the control unit 21. A moveable contact assembly 14a is fixedly secured to the motor shaft of the wiping angle varying motor 12, and has three sliders which are adapted to contact the fixed contacts 14b through 14e of the relay plate 14 as the motor rotates. The contacts 14b through 14e are arranged in such a pattern that the OFF, intermittent, low speed and high speed operation modes can be selectively detected as the moveable contact assembly 14a moves.

The operation of the wiper system having the above described structure is now described in the following. When the switch unit SW1 is switched over from the OFF position illustrated in FIG. 4 to the intermittent position, the control unit 21 then detects the state of this switch unit and supplies an energization signal to the coil RL of the intermittent relay 23, and the switch RS thereof is grounded. At the same time, the low speed terminal LO of the wiper motor 2 is grounded via the switch units SW1 and SW2, and the wiper motor 2 is rotated at low speed. The control unit 21 then produces a signal which rotates the wiping angle varying motor 12 so as to place the moveable contact unit 14a at the OFF/intermittent position which is indicated by the solid lines in FIG. 4.

Figure 3:
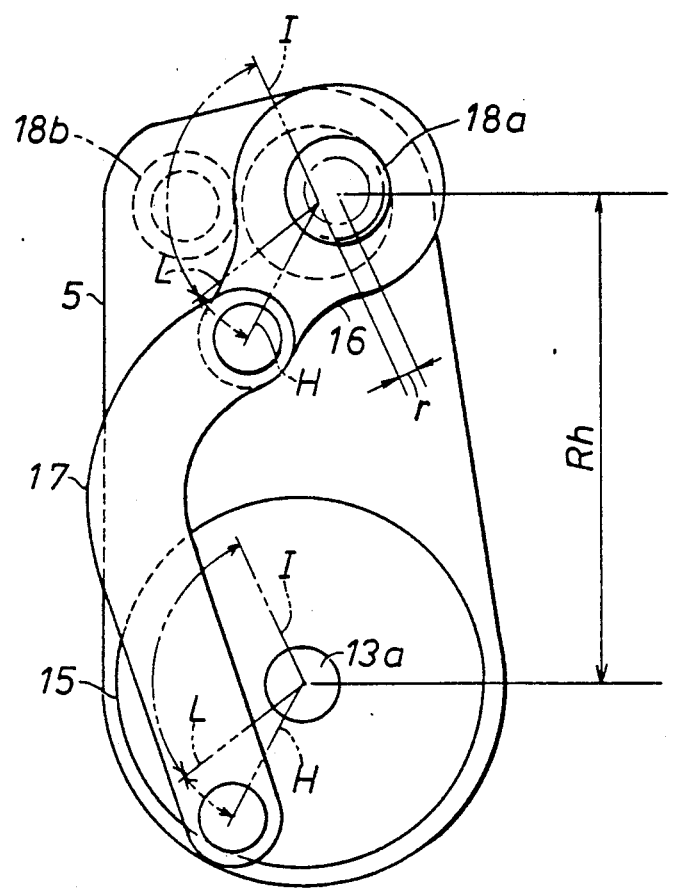
FIG. 3 is a view seen from arrow III of FIG. 2.
Figure 5:
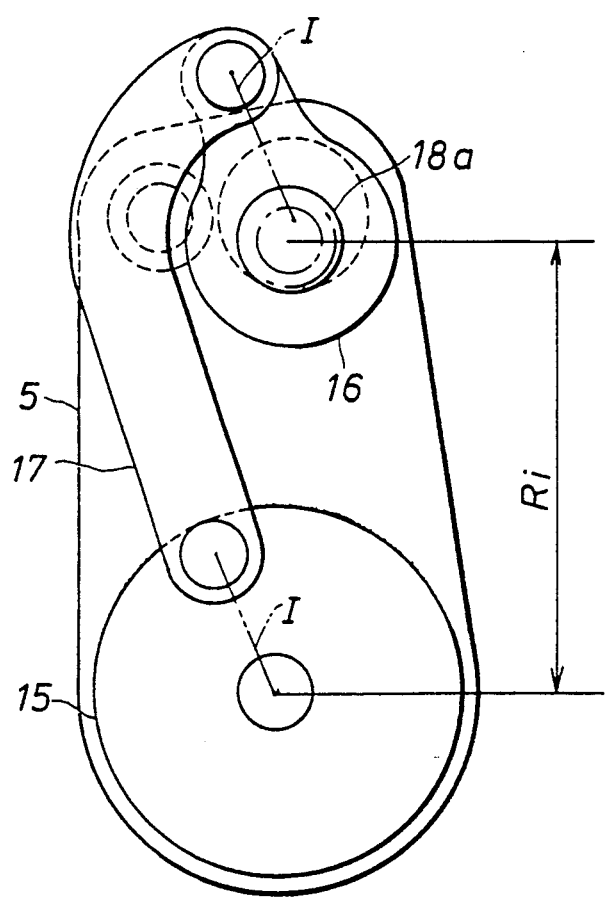
FIG. 5 is a view similar to FIG. 3 showing the pivot lever when the OFF/intermittent operation mode is selected.

At the time of the intermittent operation, the 35 joint ball 18a is positioned as illustrated in FIG. 5, and its radius of rotation is Ri, as indicated in the drawing, which is smaller than Rh shown in FIG. 3. Thus, the wiping angle is enlarged for a given stroke of the connecting rod, and the wiping action covering the relatively large range I—I is accomplished as illustrated in FIG. 1. At the same time, the intermittent relay 23 is turned on and off at an interval determined by an intermittent time setting unit not shown in the drawing, and the intermittent wiping action of the wiper arm is carried out.

Figure 6:
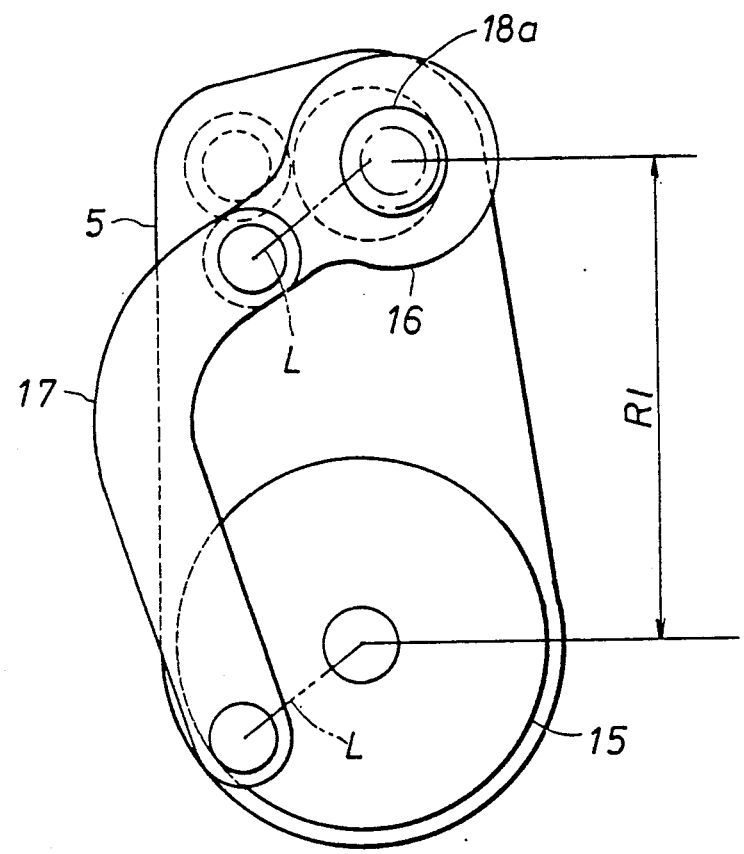
FIG. 6 is a view similar to FIG. 3 showing the pivot lever when the low speed operation mode is selected.

When the wiper switch 22 is moved to the low speed position, the wiping angle varying motor 12 is activated by the control unit 21 until it is detected that the moveable contact assembly 14a has moved to the low speed position according to the signal detected thereby. In this case, the joint ball 18a is positioned as illustrated in FIG. 6, and its radius of rotation is R1 as illustrated in FIG. 6 which is intermediate between the radius Rh of FIG. 3 and the radius Ri of FIG. 5. In this case, the wiping action of the wiper arm is made over the range L—L illustrated in FIG. 1 which is narrower than the range for the intermittent mode but wider than the range for the high speed mode.

When the high speed mode is selected, the wiping angle varying motor 12 is activated by the control unit 21 until it is detected that the moveable contact unit 14a has moved to the high speed position in the same way as described above. As a result, the radius of rotation Rh of the joint ball 18a is maximized (FIG. 3), and the wiping action of the wiper arm is made over the narrowest range H—H indicated in FIG. 1.

In the present embodiment, the timing of actuating the wiping angle varying motor 12 is selected so as to coincide with either immediately before or immediately after the point of reversal from the reverse movement. These points can be detected by using the aforementioned fixed contact pair 24f and 24g. More specifically, the point immediately before the point of reversal from the reverse movement is detected as the time when the moveable contact assembly 24a which rotates in clockwise direction as indicated by the arrow A in FIG. 4 is in contact with one of the fixed contacts 24f, and the point immediately after the point of reversal is detected as the time when the moveable contact assembly 24a is in contact with the other fixed contact 24g.

Figure 7:
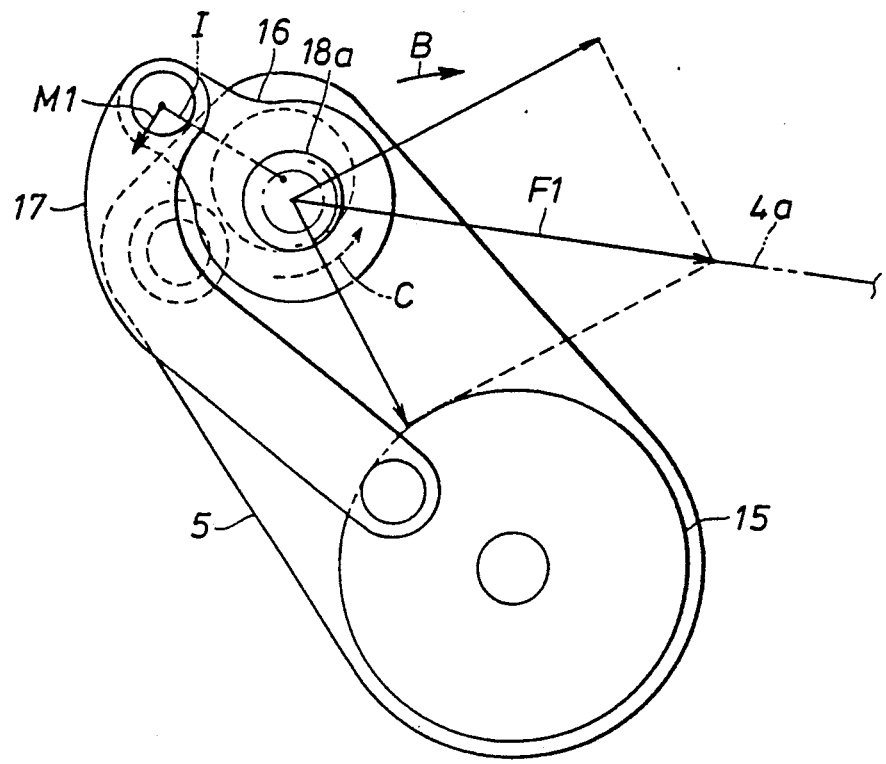
FIG. 7 is a diagram showing the way in which the operation mode is switched over from the intermittent mode to the low speed/high speed mode.

For instance, when the operating mode is to be switched from the intermittent mode to either the high speed or low speed mode, the switch over is effected immediately after the point of reversal as shown in FIG. 7. Because immediately after the point of reversal from the reverse movement the pulling force F1 exerted by the first connecting rod 4a on the joint ball 18a to rotate the pivot lever 5 in the direction indicated by the arrow B is directed to the right in the sense of the drawing, the lever arm member 16 is subjected to a moment M1 which tends to rotate the lever arm member 16 in the direction indicated by the arrow C indicated by the broken lines around its pivot axis. Likewise, when the wiping angle varying motor 12 is actuated as a result of a switch over from the intermittent mode to either the high speed or the low speed mode, the direction of rotation of the lever arm member 16 caused by the wiping angle varying motor 12 is as indicated by the arrow C. Therefore, the moment M1 can be used for rotating the lever arm member 16 in the direction of the arrow C, and the small output torque of the wiping angle varying motor 12 is therefore sufficient for rotating the lever arm member 16. As a result, the wiping angle varying motor 12 can be made compact enough, for instance, to be incorporated in the pivot shaft 8, and the freedom of layout design can be expanded.

Figure 8:
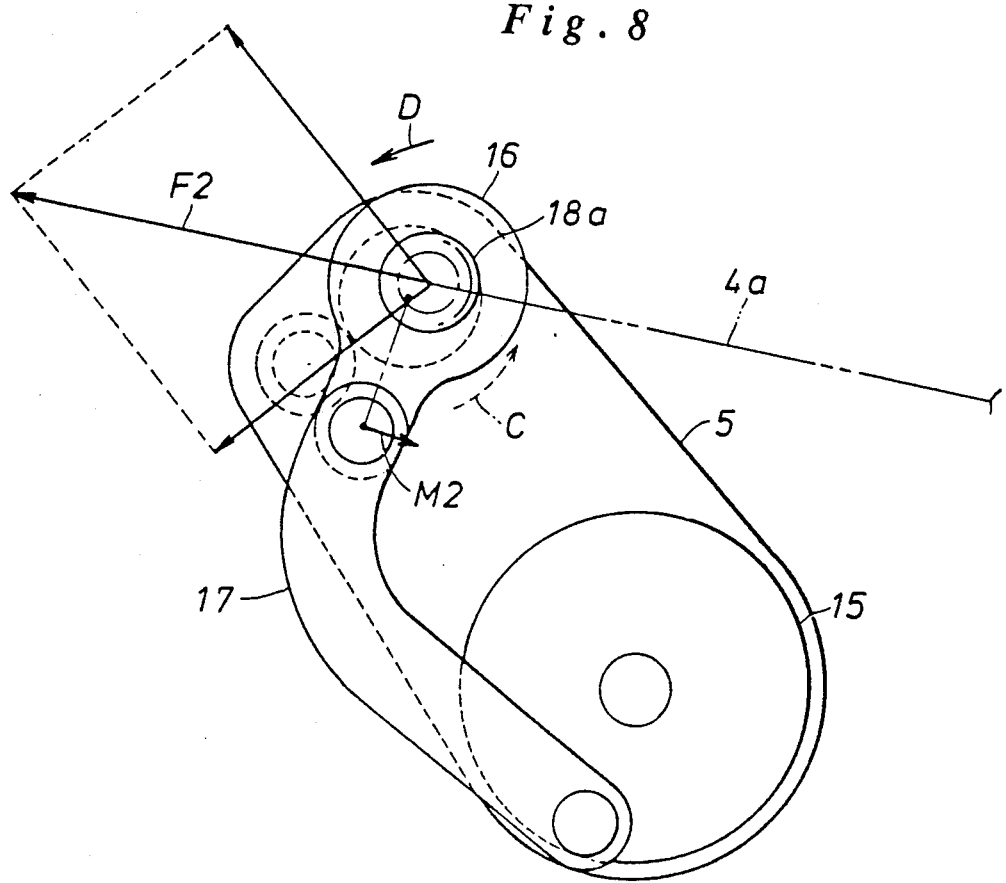
FIG. 8 is a diagram showing the way in which the operation mode is switched over from the low speed mode to the high speed mode.

FIG. 8 is a view similar to FIG. 7 showing the case in which the operation mode is switched over from the low speed mode to the high speed mode. When switching over from the low speed mode to the high speed mode, the direction of rotation of the lever arm member 16 caused by the wiping angle varying motor 12 is in the direction of the arrow C in the same way as in the previous instance, but the connecting point between the lever arm member 16 and the link rod 17 is located on the other side of the center of the joint ball 18a with respect to the center of rotation of the lever arm member 16. Therefore, the leftward pushing force F2 which tends to rotate the pivot lever 5 in the direction indicated by the arrow D in FIG. 8 acts upon the lever arm member 16 in such a direction as to rotate the lever arm member 16 in the direction indicated by the arrow C. Therefore, in this case also, the moment M2 arising from the pushing force F2 is conveniently used for rotating the lever arm member in the direction indicated by the arrow C.

Figure 9:
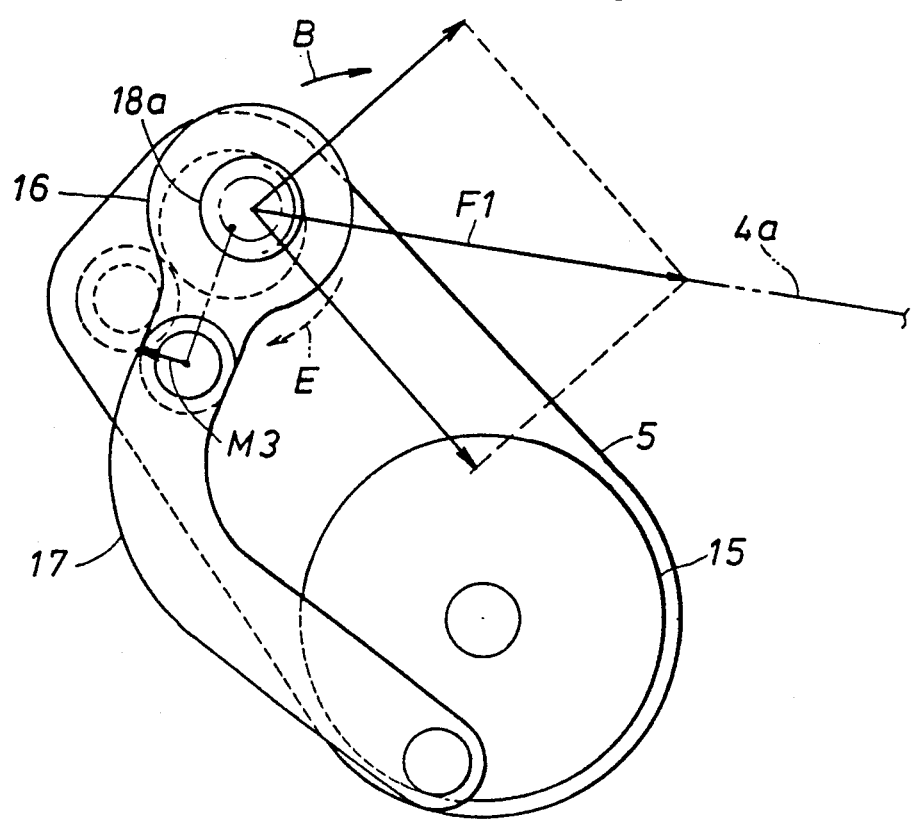
FIG. 9 is a diagram showing the way in which the operation mode is switched over from the low speed mode to the intermittent mode.

FIG. 9 shows the case in which the operation mode is switched over from the low speed mode to the intermittent mode. In this case, since the lever arm member 16 is rotated by the wiping angle varying motor 12 in the direction indicated by the arrow E which is opposite to the cases shown in FIGS. 7 and 8, the moment M3 arising from the pulling force F1 transmitted from the first connecting rod 4a immediately after the point of reversal from the reverse movement is again conveniently used for the same purpose as described above.

Figure 10:
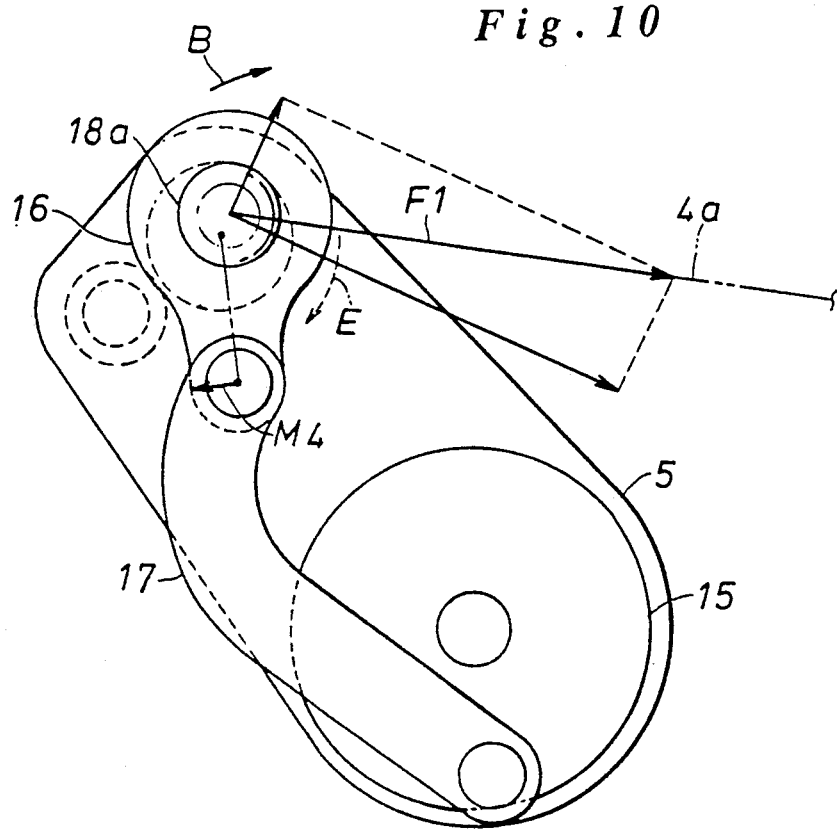
FIG. 10 is a diagram showing the way in which the operation mode is switched over from the high speed mode to the low speed/intermittent mode.

FIG. 10 shows the case in which the operation mode is switched over from the low high speed mode to the intermittent/high speed mode. In this case, since the lever arm member 16 is rotated in the direction indicated by the arrow E by the wiping angle varying motor 12 in the same way as shown in FIG. 9, the moment M4 arising from the pulling force F1 transmitted from the first connecting rod 4a immediately after the point of reversal from the reverse movement is again conveniently used for the same purpose as described above.

In this embodiment, the timing of the switch over took place immediately before or after the point of reversal from the reverse movement, but the present invention is not limited by this arrangement. It is also possible to determine the angle of rotation of the pivot lever 5 and to arrange the relative positions of the lever arm member 16 and the joint ball 18a in such a manner that the switch over may take place immediately before or after the point of reversal from the normal movement, and to combine such timings.

Thus, according to the present invention, the direction of movement of eccentric cam means to change the wiping angle of a wiper system is made to coincide with that of the moment or the force applied by the wiper motor to the eccentric cam means, and the eccentric cam means is thereby allowed to be moved with a relatively small drive force or torque. As a result, the eccentric cam means can be easily actuated even when the drive force or torque available for driving the eccentric cam means is small, and a relatively small motor can be used for driving the eccentric cam means. As a result, the actuating motor may be made compact in size, and the freedom of layout design can be increased.

Although the present invention has been described in terms of a specific embodiment thereof, it is possible to modify and alter details thereof without departing from the spirit of the present invention.

What we claim is:

1. A wiper system, comprising:
   a wiper motor means including an output end for actuating a wiper arm;
   the wiper arm being elongated and having a base end pivotally supported by a vehicle body and a free end carrying a wiper blade;
   linkage means, including a first pivot lever pivotally driven by said wiper motor means, for transmitting movement of the output end of said wiper motor means to said wiper arm so as to achieve a desired wiping movement of said wiper blade over a range of angle; and
   a wiper angle varying assembly included within said linkage means for varying the range of angle of said wiping movement of said wiper blade;
   said wiping angle varying assembly comprising actuator means including an actuator motor for moving an eccentric cam means pivotally attached to said first pivot lever for transmitting said movement of said output end of said wiper motor means to said wiper arm, and control means for activating said actuator motor upon a change in operational mode of the wiping system so as to move said eccentric cam means and thereby vary said range of angle of said wiping movement;

said control means activating said actuator means only when a first force resultant from pivotal movement of said first pivot lever to move said wiper arm does not substantially oppose a second force produced by said actuator means to pivotally move said eccentric cam means and vary said range of angle.

2. A wiper system according to claim 1, wherein said control means activates said actuator means to pivotally move said first pivot lever and said eccentric cam means in the same direction such that said first force and said second force assist each other.

3. A wiper system according to claim 2, wherein
said first pivot lever is pivotally supported by said vehicle body; and
wherein said linkage means further includes:
a second pivot lever pivotally supported by said vehicle body, said base end of said wiper arm being integrally connected to said second pivot lever;
a first connecting rod having a first end connected to the output end of said wiper motor means and a second end pivotally connected to a free end of said first pivot lever via a joint means; and
a second connecting rod having a first end connected to a free end of said first pivot lever and a second end pivotally connected to a free end of said second pivot lever;
said joint means being movable toward and away from a center of rotation of said first pivot lever by said actuator means and said eccentric cam means.

4. A wiper system according to claim 2, wherein
said base end of said wiper arm is integrally connected to said first pivot lever; and wherein said linkage means further comprises:
a connecting rod having a first end connected to the output end of said wiper motor means and a second end pivotally connected to a free end of said first pivot lever via a joint means;
said joint means being movable toward and away from a center of rotation of said first pivot lever by said actuator means and said eccentric cam means.

5. A wiper system according to claim 2, including a second wiper arm each of said wiper arms being pivotally supported by said vehicle body at a base end thereof and carrying a wiper blade at a free end thereof; and wherein said base end of a first one of said wiper arms is integrally connected to said first pivot lever;
a second pivot lever pivotally supported by said vehicle body, said base end of a second one of said wiper arms is integrally connected to said second pivot lever;
a first connecting rod having a first end connected to an output end of said wiper motor means and a second end pivotally connected to a free end of said first pivot lever via a joint means; and
a second connecting rod having a first end connected to a free end of said first pivot lever and a second end pivotally connected to a free end of said second pivot lever;
said joint means being movable toward and away from a center of rotation of said first pivot lever by said actuator means and said eccentric cam means.

6. A wiper system according to claim 5, wherein said eccentric cam means and said joint means comprise a lever arm member pivotally secured to said first pivot lever, and a ball joint member secured to said lever arm member offset from a center of rotation of said lever arm member relative to said first pivot lever, said second end of said first connecting rod being coupled to said ball joint member.

7. A wiper system according to claim 6, wherein said first pivot lever is pivotally supported by said vehicle body via a hollow pivot shaft integrally attached to said first pivot lever, and said actuator motor is coaxially received in said pivot shaft, and said actuator means further comprises an actuator arm member integrally secured to an output shaft of said actuator motor, and a link member having a first end pivotally connected to said actuator arm member and a second end pivotally connected to a part of said lever arm member spaced from a center of rotation of said lever arm member relative to said first pivot lever.

8. A wiper system according to claim 5, wherein said control means comprises a position sensor for detecting positions of said first pivot lever immediately before and after a reversal point at which said first pivot lever changes a direction of movement, and wherein said sensor selectively activates said actuator means when said first pivot lever is immediately before or after said reversal point depending on a relationship between directions of said first and second forces.

* * * * *